US011862890B2

(12) United States Patent
Kakuda et al.

(10) Patent No.: US 11,862,890 B2
(45) Date of Patent: Jan. 2, 2024

(54) CONNECTION TERMINAL AND CONNECTOR

(71) Applicant: SUMITOMO WIRING SYSTEMS, LTD., Mie (JP)

(72) Inventors: Satoshi Kakuda, Mie (JP); Takuya Utsunomiya, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 119 days.

(21) Appl. No.: 17/610,397

(22) PCT Filed: May 8, 2020

(86) PCT No.: PCT/JP2020/018647
§ 371 (c)(1),
(2) Date: Nov. 10, 2021

(87) PCT Pub. No.: WO2020/235355
PCT Pub. Date: Nov. 26, 2020

(65) Prior Publication Data
US 2022/0255258 A1 Aug. 11, 2022

(30) Foreign Application Priority Data
May 22, 2019 (JP) ................................ 2019-095877

(51) Int. Cl.
*H01R 13/506* (2006.01)

(52) U.S. Cl.
CPC ....... *H01R 13/506* (2013.01); *H01R 2201/26* (2013.01)

(58) Field of Classification Search
None
See application file for complete search history.

(56) References Cited

U.S. PATENT DOCUMENTS 3,641,483 A * 2/1972 Bonhomme .......... H01R 13/111 439/851
4,906,212 A * 3/1990 Mixon, Jr. ............ H01R 13/111 439/948

(Continued)

FOREIGN PATENT DOCUMENTS

JP 2018-026273 A 2/2018
WO 2011/064639 A1 6/2011

OTHER PUBLICATIONS

International Search Report dated Jul. 21, 2020 for WO 2020/235355 A1 (4 pages).

*Primary Examiner* — Oscar C Jimenez
(74) *Attorney, Agent, or Firm* — Venjuris, P.C.

(57) ABSTRACT

The present disclosure provides a connection terminal and a connector capable of suppressing an increase in manufacturing cost. A vehicle-side terminal 50 includes a terminal connecting portion 51 to be electrically connected to a charger-side terminal, a wire connecting portion 55 to be electrically connected to a wire, and an intermediate portion 56 provided between the terminal connecting portion 51 and the wire connecting portion 55. The terminal connecting portion 51 has a hollow cylindrical shape. The terminal connecting portion 51 includes a first slit 52X, 53X extending over an entire length in an axial direction of the terminal connecting portion 51. The intermediate portion 56 has a rectangular tube shape. The intermediate portion 56 includes a second slit 56X extending over an entire length in an axial direction of the intermediate portion 56.

18 Claims, 12 Drawing Sheets

(56) References Cited

U.S. PATENT DOCUMENTS

| | | | | |
|---|---|---|---|---|
| 5,135,418 | A * | 8/1992 | Hatagishi | H01R 13/111 439/857 |
| 5,620,347 | A | 4/1997 | Sawada | |
| 9,601,856 | B2 * | 3/2017 | Regantini | H01R 13/18 |
| 9,647,370 | B2 * | 5/2017 | Uchida | H01R 13/426 |
| 10,312,619 | B2 * | 6/2019 | Lubeley | H01R 43/16 |
| 2015/0380863 | A1 | 12/2015 | Uchida | |
| 2018/0115115 | A1 * | 4/2018 | Nakashima | H01R 9/0518 |
| 2019/0267735 | A1 | 8/2019 | Lu et al. | |

* cited by examiner

CONNECTION TERMINAL AND CONNECTOR

CROSS REFERENCE TO RELATED APPLICATIONS

This application is a national phase of PCT application No. PCT/JP2020/018647, filed on 8 May 2020, which claims priority from Japanese patent application No. 2019-095877, filed on 22 May 2019, all of which are incorporated herein by reference.

TECHNICAL FIELD

The present disclosure relates to a connection terminal and a connector.

BACKGROUND

Conventionally, a vehicle such as a plug-in hybrid vehicle or electrical vehicle is provided with a charging connector for charging an installed power storage device (see, for example, Patent Document 1). The vehicle of this type includes various harnesses and various connectors including connection terminals for connecting the harnesses as members for electrically connecting the charging connector and the power storage device.

PRIOR ART DOCUMENT

Patent Document

Patent Document 1: JP 2018-026273 A

SUMMARY OF THE INVENTION

Problems to be Solved

Since the connection terminal is formed by cutting for the above connector, there is a problem of high manufacturing cost.

The present disclosure aims to provide a connection terminal and a connector capable of suppressing an increase in manufacturing cost.

Means to Solve the Problem

The present disclosure is directed to a connection terminal with a terminal connecting portion to be electrically connected to a mating terminal, a wire connecting portion to be electrically connected to a wire, and an intermediate portion provided between the terminal connecting portion and the wire connecting portion, wherein the terminal connecting portion has a hollow cylindrical shape, the terminal connecting portion includes a first slit extending over an entire length in an axial direction of the terminal connecting portion, the intermediate portion has a rectangular tube shape, and the intermediate portion includes a second slit extending over an entire length in an axial direction of the intermediate portion.

Effect of the Invention

According to the connection terminal and the connector of the present disclosure, an effect of being capable of suppressing an increase in manufacturing cost can be achieved.

DETAILED DESCRIPTION TO EXECUTE THE INVENTION

Description of Embodiments of Present Disclosure

Figure 1:
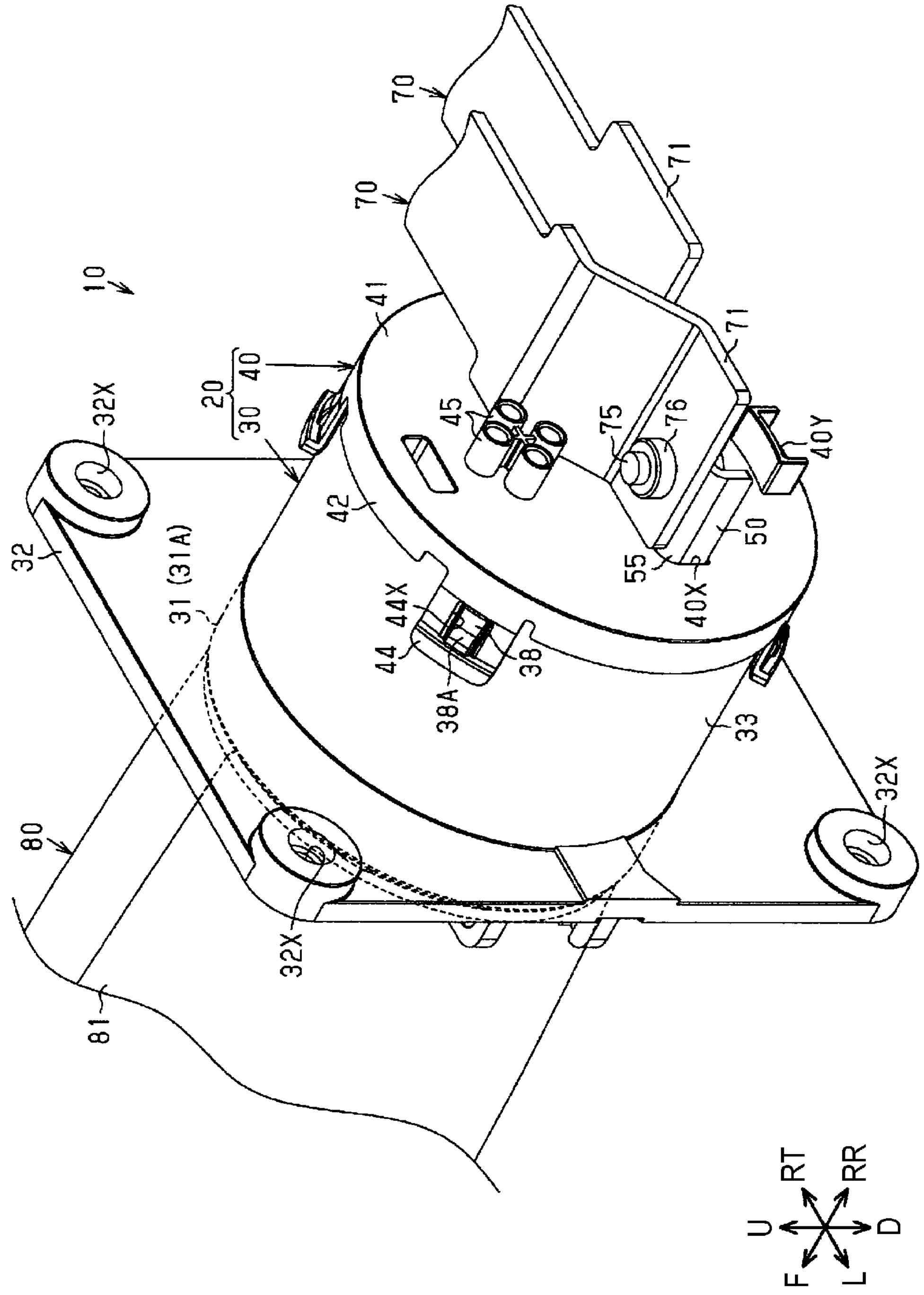
FIG. 1 is a schematic perspective view showing a connector of one embodiment.

First, embodiments of the present disclosure are listed and described.

[1] The connection terminal of the present disclosure includes a terminal connecting portion to be electrically connected to a mating terminal, a wire connecting portion to be electrically connected to a wire, and an intermediate portion provided between the terminal connecting portion and the wire connecting portion, wherein the terminal connecting portion has a hollow cylindrical shape, the terminal connecting portion includes a first slit extending over an entire length in an axial direction of the terminal connecting portion, the intermediate portion has a rectangular tube shape, and the intermediate portion includes a second slit extending over an entire length in an axial direction of the intermediate portion.

According to this configuration, the terminal connecting portion and the intermediate portion are formed into a tubular shape having a hollow structure inside. Further, the terminal connecting portion and the intermediate portion are respectively formed with the first and second slits extending over the entire lengths in the axial directions of the terminal connecting portion and the intermediate portion. Thus, the connection terminal including the terminal connecting portion and the intermediate portion can be formed by press-working. In this way, the connection terminal can be more inexpensively manufactured than conventional connection terminals manufactured by cutting. As a result, increases in manufacturing costs of the connection terminal and a connector including the connection terminal can be suitably suppressed.

Note that the "tubular shape" in this specification means not only the one formed by a peripheral wall continuous over the entire periphery in a circumferential direction, but also the one formed by a peripheral wall having slit(s) extending in an axial direction in parts in the circumferential direction or the one formed by a peripheral wall formed with radially penetrating through hole(s).

[2] Preferably, the terminal connecting portion includes a hollow cylindrical base portion connected to the intermediate portion and a hollow cylindrical tubular connecting portion connected to the base portion, and the tubular connecting portion includes a plurality of resilient pieces provided at predetermined intervals along a circumferential direction of the tubular connecting portion and the plurality of resilient pieces form a hollow cylindrical contour of the tubular connecting portion.

According to this configuration, the terminal connecting portion can be in contact with the mating terminal at many points by the plurality of resilient pieces. Thus, many contact points with the mating terminal can be ensured and contact resistance between the mating terminal and the terminal connecting portion can be reduced. Further, since the connection terminal can be formed by press-working, an increase in processing cost caused by an increase in the number of the resilient pieces can be suppressed as compared to the case where a connection terminal is formed by cutting. Thus, the number of the resilient pieces can be increased while an increase in manufacturing cost is suppressed. As a result, the number of the contact points with the mating terminal can be increased. Thus, the contact resistance between the mating terminal and the terminal connecting portion can be reduced. Since heat generation during the energization of the connection terminal can be suitably suppressed in this way, a large current can be caused to flow in the connection terminal.

[3] Preferably, each resilient piece includes a base end part connected to the base portion, a tip part serving as an end part on a side opposite to the base end part in the axial direction of the tubular connecting portion and a contact portion provided between the base portion and the tip part, and a thickness of the base end part is smaller than that of the contact portion.

According to this configuration, since the base end part serving as a fixed end of each resilient piece is formed to be thinner than the contact portion, each resilient piece is easily resiliently deformed. Since each resilient piece is easily deflected in a radial direction of the tubular connecting portion in this way, each resilient piece can be suitably brought into contact with the mating terminal.

[4] Preferably, the thickness of the contact portion is constant over an entire length in a longitudinal direction of the contact portion along the axial direction of the tubular connecting portion. According to this configuration, the contact portion can be formed to be thicker than the base end part over the entire length in the longitudinal direction of the contact portion. Since a conductor cross-sectional area of the contact portion can be increased in this way, heat generation during the energization of the connection terminal can be suitably suppressed.

[5] Preferably, a thickness of the tip part becomes smaller from the side of the contact portion toward an opening end of the tubular connecting portion, and an inner diameter of the tip part of the tubular connecting portion becomes larger from the side of the contact portion toward the opening end of the tubular connecting portion.

According to this configuration, an opening diameter of the tubular connecting portion becomes wider from the side of the contact portion toward the opening end of the tubular connecting portion at an opening end part of the tubular connecting portion. In this way, the mating terminal is guided to a back side of the tubular connecting portion along the slopes of the tip parts in inserting the mating terminal into the tubular connecting portion. In this way, the mating terminal can be easily inserted into the tubular connecting portion.

[6] Preferably, the tubular connecting portion includes a plurality of third slits extending over an entire length in the axial direction of the tubular connecting portion from the opening end of the tubular connecting portion, the plurality of third slits are provided at predetermined intervals along the circumferential direction of the tubular connecting portion, and some of the plurality of third slits constitute the first slit.

According to this configuration, the plurality of third slits are formed to extend over the entire length in the axial direction of the tubular connecting portion. Thus, water and mud having intruded into the tubular connecting portion can be suitably discharged to the outside of the tubular connecting portion through the third slits.

[7] The base portion includes a plurality of projections formed on an outer surface of the base portion, the plurality of projections include two projections provided at positions different from each other in an axial direction of the base portion, and each projection projects further radially outward than an outer surface of the tubular connecting portion.

According to this configuration, the projections projecting further radially outward than the outer surface of the tubular connecting portion are provided on the outer surface of the base portion. Thus, if the connection terminal is, for example, inclined in the terminal accommodating portion when being accommodated into the connector housing, the projection can be brought into contact with the inner surface of the connector housing before the outer surface of the tubular connecting portion contacts the inner surface of the connector housing. Therefore, even if the connection terminal is inclined in the connector housing, the contact of the tubular connecting portion with the inner surface of the connector housing can be suitably suppressed. Here, if the tubular connecting portion contacts the inner surface of the connector housing, there is a problem that an insertion force in inserting the mating terminal into the tubular connecting portion increases. Further, if the insertion force in inserting the mating terminal into the tubular connecting portion increases, there is a problem that a load applied to the tubular connecting portion increases and the tubular connecting portion is more easily damaged. In contrast, in the above configuration, the contact of the tubular connecting portion with the inner surface of the connector housing can be suppressed, wherefore the occurrence of the above problems can be suppressed.

[8] Preferably, a planar shape of the intermediate portion when viewed from the axial direction of the intermediate portion is larger in size than that of the terminal connecting portion when viewed from the axial direction of the terminal connecting portion. According to this configuration, a conductor cross-sectional area of the intermediate portion can be increased, wherefore heat generation during the energization of the connection terminal can be suitably suppressed.

[9] Preferably, a through hole penetrating through a conductive material of the connection terminal to discharge a liquid in a direction different from a direction toward the wire connecting portion is further provided between the wire connecting portion and the terminal connecting portion.

According to this configuration, even if a liquid such as water flows from the side of the terminal connecting portion toward the side of the wire connecting portion, the flow of that liquid to the wire connecting portion can be suppressed by the through hole formed between the wire connecting portion and the terminal connecting portion. In this way, the flow of the liquid such as water to a connected part of the wire connecting portion and the wire can be suppressed. Thus, the occurrence of corrosion, for example, in the connected part of the wire connecting portion and the wire can be suitably suppressed.

[10] Preferably, the wire connecting portion includes a reinforcing portion projecting in a direction intersecting the longitudinal direction. According to the configuration, the strength of the wire connecting portion to be connected to the wire can be enhanced by providing the reinforcing portion. Further, since a conductor cross-sectional area of the wire connecting portion can be increased, heat generation during the energization of the connection terminal can be suitably suppressed.

[11] Preferably, the plurality of resilient pieces respectively have a plurality of inner peripheral surfaces surrounding a center axis of the tubular connecting portion, each of the plurality of inner peripheral surfaces includes a dent, and the dents of the plurality of inner peripheral surfaces are provided at the same position in the axial direction of the tubular connecting portion. According to this configuration, the electrical connectivity of the connection terminal and the mating terminal can be improved by the dents of the plurality of resilient pieces.

[12] Preferably, each resilient piece includes a tip part, and the dent is provided at a position closer to the tip part of each resilient piece than the base portion in the inner peripheral surface of each resilient piece. According to this configuration, the electrical connectivity of the connection terminal and the mating terminal can be improved by locally processing the inner peripheral surfaces of the resilient pieces.

[13] Preferably, each resilient piece includes a contact portion between the base portion and the tip part, the inner peripheral surface of each resilient piece includes a tip part inner peripheral surface serving as a slope included in the tip part of each resilient piece and a contact portion inner peripheral surface included in the contact portion, and the dent is adjacent to a boundary between the tip part inner peripheral surface and the contact portion inner peripheral surface in the contact portion inner peripheral surface of each resilient piece or extends across the boundary. According to this configuration, the electrical connectivity of the connection terminal and the mating terminal can be improved by locally processing the inner peripheral surfaces of the resilient pieces.

[14] A connector of the present disclosure preferably includes the connection terminal of any one of [1] to [13] described above, and a connector housing for holding the connection terminal.

According to this configuration, an increase in the manufacturing cost of the connector including the connection terminal and the connector housing can be suitably suppressed.

[15] Preferably, the connector housing is mounted in a vehicle, and a charging connector is connected to the connector housing. According to this configuration, an increase in the manufacturing cost of the connector to which the charging connector is connected can be suitably suppressed.

Details of Embodiment of Present Disclosure

Specific examples of a connection terminal and a connector of the present disclosure are described below with reference to the drawings. In each figure, some of components may be shown in an exaggerated or simplified manner for the convenience of description. A dimensional ratio of each part may be different in each figure. "Parallel", "orthogonal", "horizontal" in this specification mean not only strictly parallel, orthogonal and horizontal, but also substantially parallel, orthogonal and horizontal within a range in which functions and effects in an embodiment are achieved. "Facing each other" in this specification indicates that surfaces or members are at positions opposite to each other and means not only cases where surfaces or members are at positions perfectly opposite to each other, but also cases where surfaces or members at positions partially opposite to each other. Note that the present invention is not limited to these illustrations and is intended to be represented by claims and include all changes in the scope of claims and in the meaning and scope of equivalents.

(Schematic Configuration of Vehicle-Side Connector 10)

A vehicle-side connector 10 shown in FIG. 1 is for charging a power storage device (not shown) installed in a vehicle V (see FIG. 2) such as an electric vehicle or plug-in hybrid vehicle. The vehicle-side connector 10 is, for example, a connector for quick charging in which a large current of about 200 A to 400 A flows.

Figure 2:
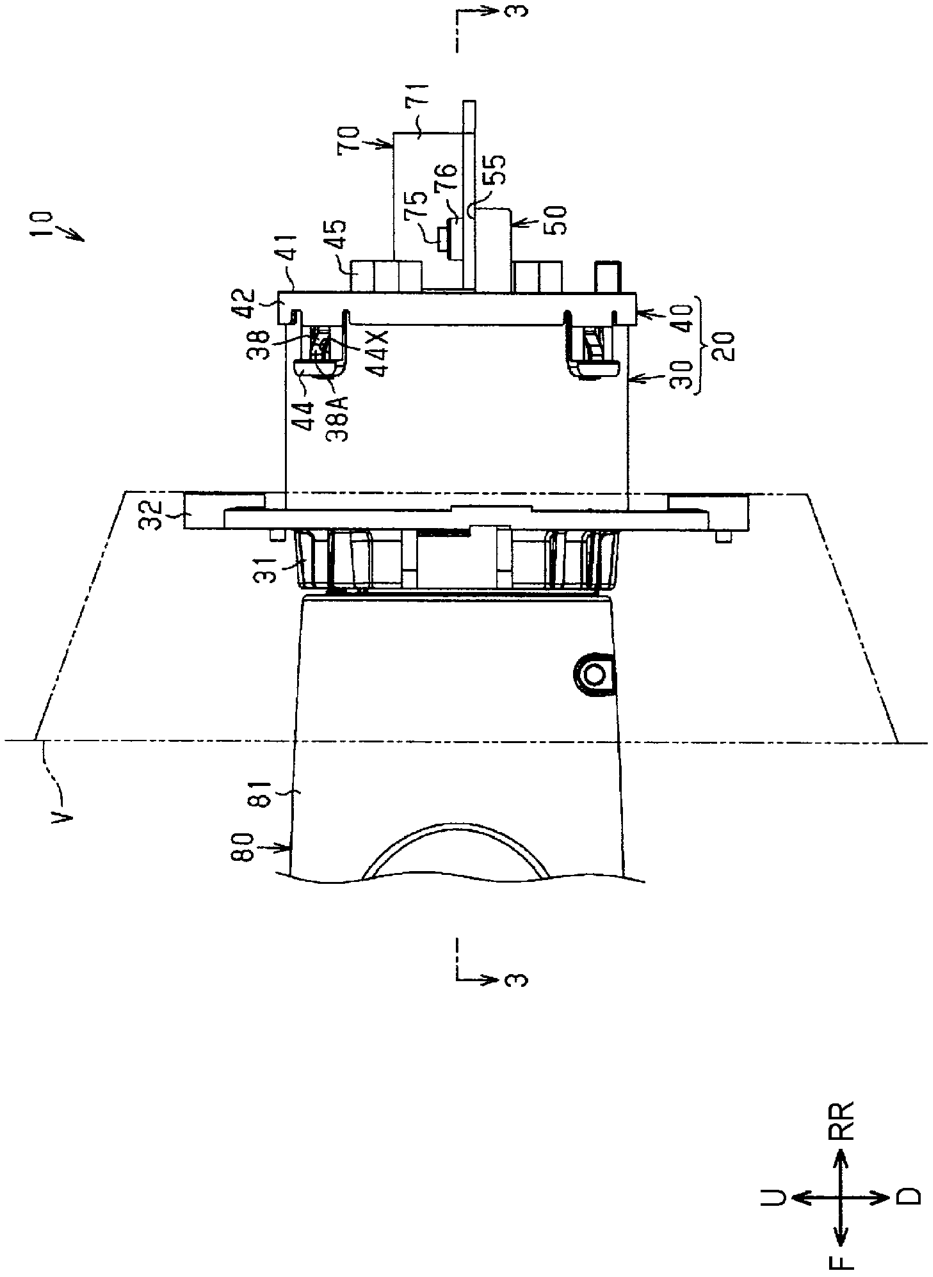
FIG. 2 is a schematic side view showing the connector of the one embodiment.

As shown in FIG. 2, the vehicle-side connector 10 is fixed to the vehicle V by fastening members (not shown) such as bolts. The vehicle-side connector 10 is connected to the power storage device (not shown) via wires 70.

Figure 3:
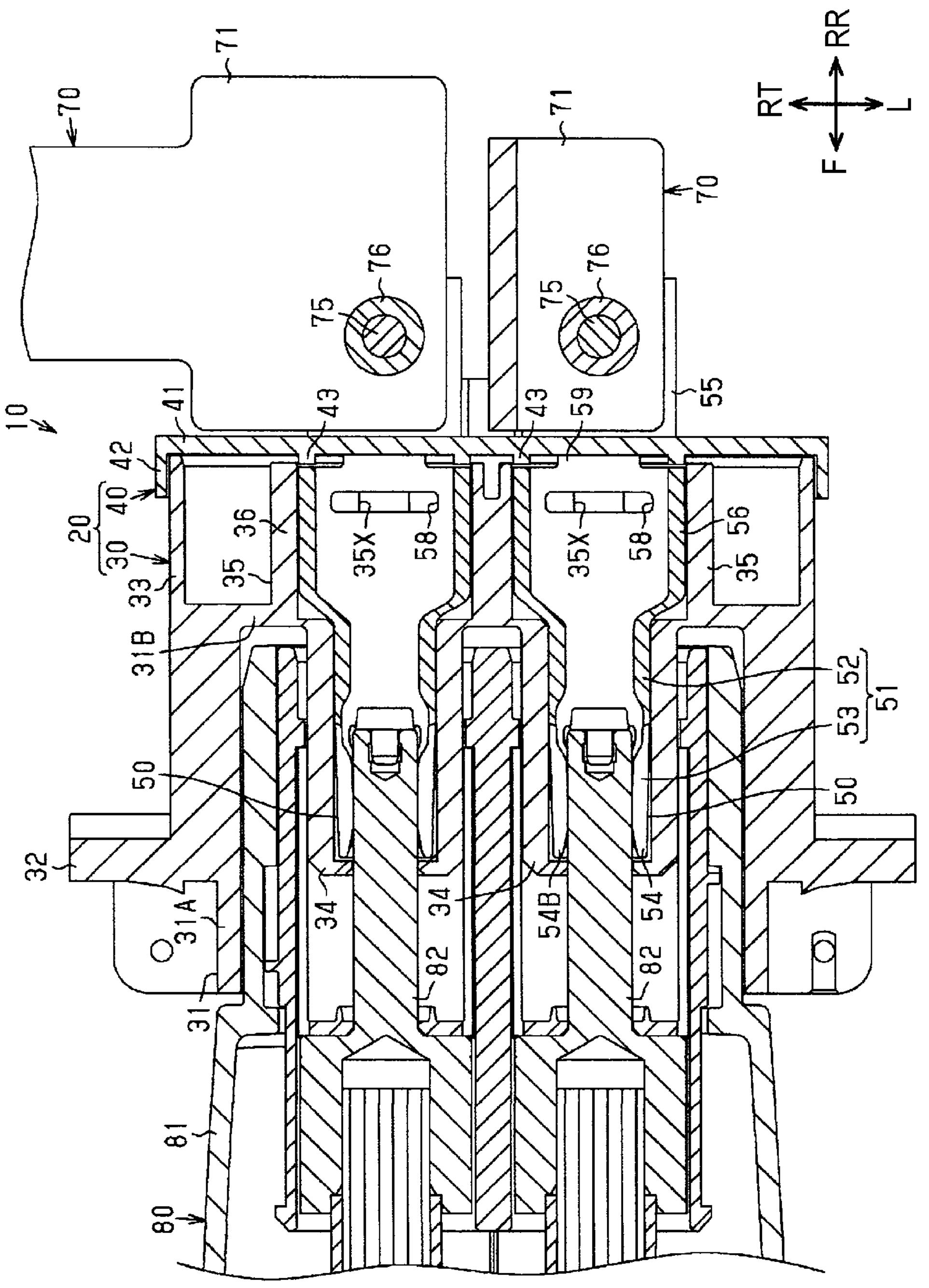
FIG. 3 is a schematic section showing the connector of the one embodiment.

As shown in FIGS. 2 and 3, a charger-side connector 80 (charging connector) is connected as a mating connector to the vehicle-side connector 10. In an example shown in FIGS. 2 and 3, the charger-side connector 80 is connected to the vehicle-side connector 10 from a left side. A lateral direction in FIGS. 2 and 3 is an inserting/withdrawing direction of the charger-side connector 80. In the following description, the lateral direction in FIGS. 2 and 3 is referred to as a front-rear direction, a vertical direction in FIG. 2 is referred to as a vertical direction and a vertical direction in FIG. 3 is referred to as a lateral direction. Further, in the following description, a left side of FIG. 2 is referred to as a front side, a right side of FIG. 2 is referred to as a rear side, an upper side of FIG. 2 is referred to as an upper side, a lower side of FIG. 2 is referred to as a lower side, an upper side of FIG. 3 is referred to as a right side, and a lower side of FIG. 3 is referred to as a left side.

(Specific Configuration of Vehicle-Side Connector 10)

As shown in FIG. 3, the vehicle-side connector 10 includes a connector housing 20 and one or more (two in this embodiment) vehicle-side terminals 50. The connector housing 20 includes a housing body 30 and a retainer 40.

(Configuration of Housing Body 30)

The housing body 30 is made of insulating synthetic resin. The housing body 30 includes a fitting portion 31, a flange portion 32, a tube portion 33, one or more (two in this embodiment) terminal accommodating portions 34, and one or more (two in this embodiment) terminal holding portions 35.

The fitting portion 31 is, for example, formed into a tubular shape. The charger-side connector 80 is inserted into the fitting portion 31. Here, the charger-side connector 80 includes a connector housing 81 and charger-side terminals 82 (mating terminals) held in the connector housing 81. A tip part (here, a rear end part) of the connector housing 81 is fit into the fitting portion 31. The fitting portion 31 is, for example, formed into a tubular shape closed on one end (here, rear end). The fitting portion 31 of this embodiment is formed into a hollow cylindrical shape with an open front end part. The fitting portion 31 includes, for example, a hollow cylindrical receptacle 31A and a back wall portion 31B closing the rear end of the receptacle 31A.

As shown in FIG. 1, the flange portion 32 is formed to project radially outwardly of the receptacle 31A from the outer peripheral surface of the receptacle 31A. The flange portion 32 is, for example, formed to project radially outward over the entire periphery in a circumferential direction of the receptacle 31A. The flange portion 32 of this embodiment is in the form of a rectangular plate. The flange portion 32 includes a plurality of mounting holes 32X penetrating through the flange portion 32 in a plate thickness direction (here, front-rear direction). The fastening members (not shown) such as bolts are inserted into the respective mounting holes 32X. The vehicle-side connector 10 is fixed to the vehicle V (see FIG. 2) by these fastening members.

As shown in FIG. 3, the tube portion 33 extends rearward from the back wall portion 31B. The tube portion 33 of this embodiment is formed into a hollow cylindrical shape. The outer peripheral surface of the tube portion 33 is, for example, formed to be continuous with the outer peripheral surface of the receptacle 31A formed behind the flange portion 32. An inner diameter of the tube portion 33 is, for example, larger than that of the fitting portion 31.

Each terminal accommodating portion 34 extends forward from the back wall portion 31B. Each terminal accommodating portion 34 is formed to be surrounded by the receptacle 31A. Each terminal accommodating portion 34 is, for example, formed into a tubular shape. Each terminal accommodating portion 34 of this embodiment is formed into a hollow cylindrical shape. Two terminal accommodating portions 34 are, for example, provided side by side in the lateral direction of the vehicle-side connector 10.

Each terminal holding portion 35 extends rearward from the back wall portion 31B. Each terminal holding portion 35 is, for example, formed into a tubular shape having a hollow structure inside. Each terminal holding portion 35 includes peripheral walls 36 for surrounding the vehicle-side terminal 50. The peripheral walls 36 are formed to extend in the front-rear direction.

Figure 4:
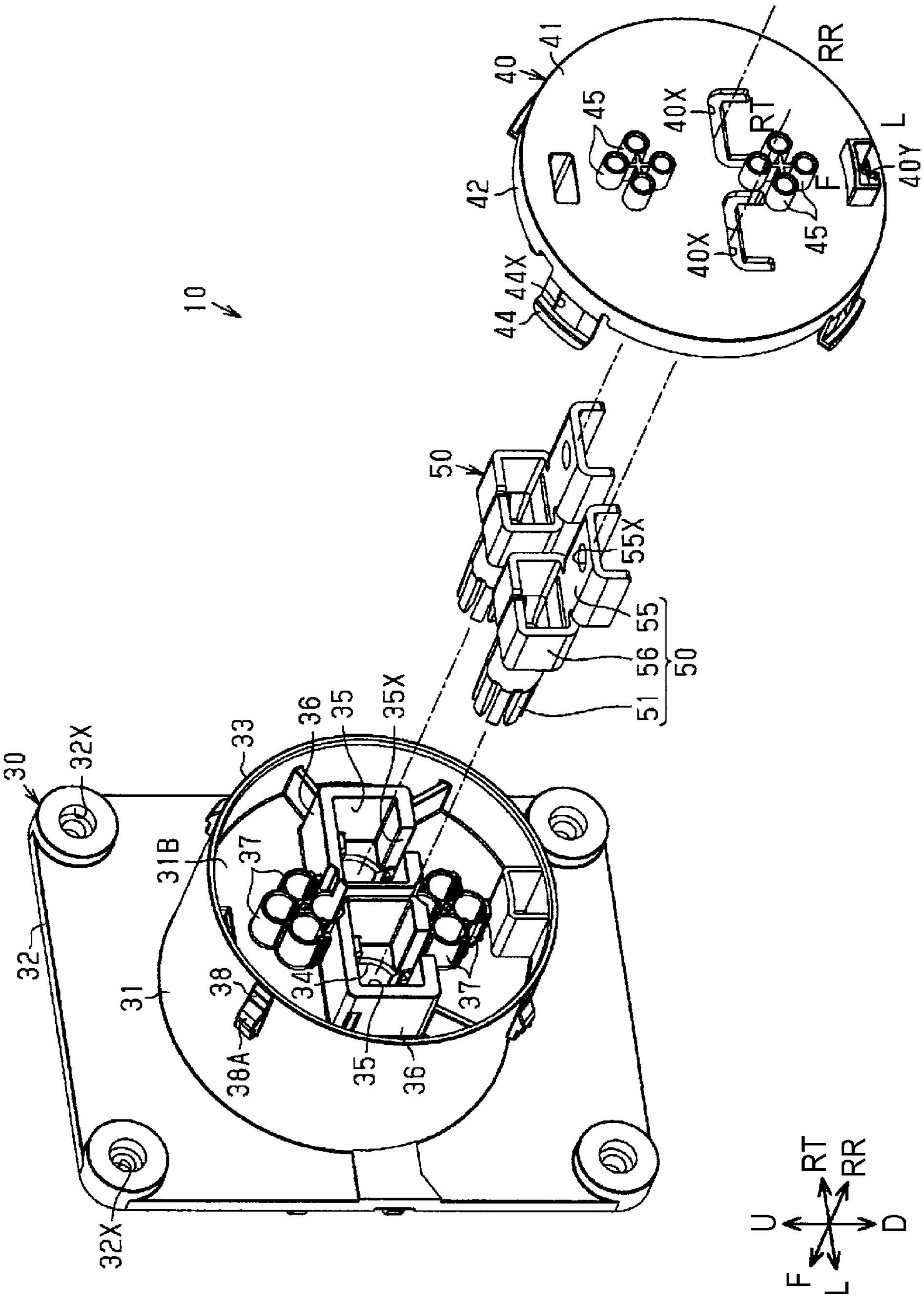
FIG. 4 is a schematic exploded perspective view showing a vehicle-side connector of the one embodiment.

As shown in FIG. 4, each terminal holding portion 35 of this embodiment is formed into a rectangular tube shape. Each terminal holding portion 35 is formed to have a rectangular planer shape when viewed from an axial direction (here, front-rear direction) of the terminal holding portion 35. That is, each terminal holding portion 35 has four peripheral walls 36. Each peripheral wall 36 is in the form of a plate. Each terminal holding portion 35 is integrally formed by four continuous peripheral walls 36.

Each terminal holding portion 35 includes a slit 35X extending in the axial direction of the terminal holding portion 35. The slit 35X is formed to extend over the entire length in the axial direction of the terminal holding portion 35. The slit 35X is, for example, formed in the peripheral wall 36 provided on a lower side, out of the four peripheral walls 36.

An internal space of each terminal holding portion 35 communicates, for example, with that of each terminal accommodating portion 34. The internal space of each terminal holding portion 35 is, for example, formed to be wider than that of the terminal accommodating portion 34. For example, the internal space of each terminal holding portion 35 is formed one size larger than the terminal accommodating portion 34. The rear surface of the back wall portion 31B is partially exposed in each terminal holding portion 35. The vehicle-side terminal 50 is inserted into the terminal accommodating portion 34 and the terminal holding portion 35. That is, each terminal accommodating portion 34 and each terminal holding portion 35 constitute a terminal accommodation tube for accommodating the vehicle-side terminal 50.

The housing body 30 includes a plurality of signal terminal holding portions 37. An unillustrated signal terminal is accommodated into each signal terminal holding portion 37. The signal terminal is, for example, used for communication with a charging device. A signal line is connected to the signal terminal.

(Configuration of Vehicle-Side Terminal 50)

Figure 5:
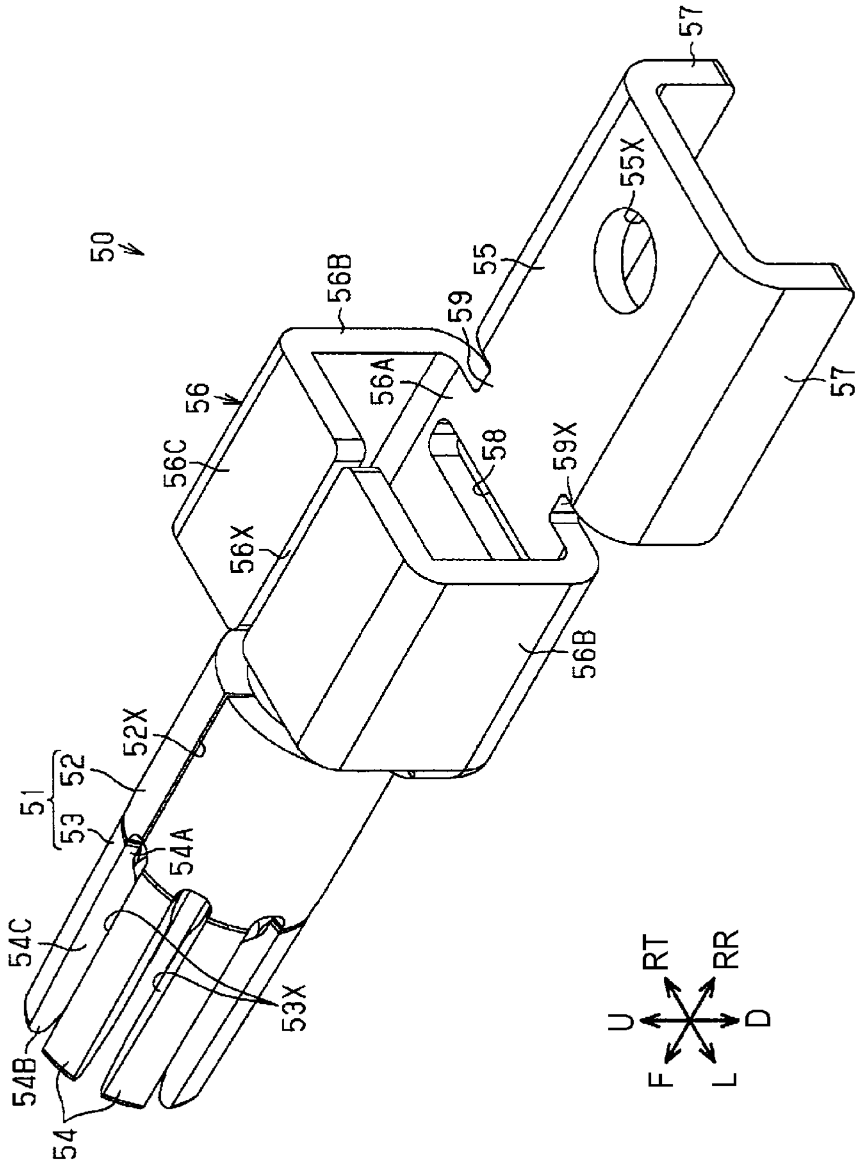
FIG. 5 is a schematic perspective view showing a vehicle-side terminal of the one embodiment.
Figure 6:
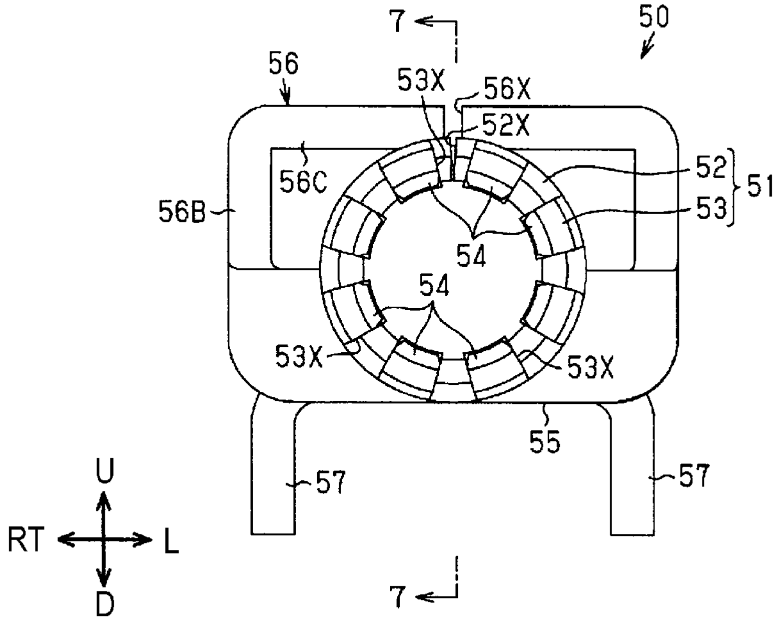
FIG. 6 is a schematic front view showing the vehicle-side terminal of the one embodiment.

As shown in FIGS. 5 and 6, each vehicle-side terminal 50 includes, for example, a terminal connecting portion 51 to be electrically connected to the charger-side terminal 82 (see FIG. 3) as a mating terminal, and a wire connecting portion 55 to be electrically connected to the wire 70 (see FIG. 3). Each vehicle-side terminal 50 includes an intermediate portion 56 provided between the terminal connecting portion 51 and the wire connecting portion 55. Each vehicle-side terminal 50 is, for example, a single component in which the terminal connecting portion 51, the intermediate portion 56 and the wire connecting portion 55 are integrally formed while being connected in the front-rear direction. A metal material such as copper, copper alloy, aluminum, aluminum alloy or stainless steel can be, for example, used as a material of each vehicle-side terminal 50. Surface processing such as silver plating, tin plating or aluminum plating may be applied to each vehicle-side terminal 50 according to the type of the constituent metal and the use environment of the vehicle-side terminal 50. Each vehicle-side terminal 50 can be formed, for example, by press-working a metal plate excellent in conductivity. In this specification, an arrangement direction of the terminal connecting portion 51, the intermediate portion 56 and the wire connecting portion 55 is called a "longitudinal direction" in the vehicle-side terminal 50. In this embodiment, the longitudinal direction of the vehicle-side terminal 50 coincides with the front-rear direction.

(Configuration of Terminal Connecting Portion 51)

As shown in FIG. 5, the terminal connecting portion 51 is, for example, provided in a front end part of the vehicle-side terminal 50. The terminal connecting portion 51 is, for example, a female terminal. The terminal connecting portion 51 includes a base portion 52 and a tubular connecting portion 53 provided in front of the base portion 52. In the terminal connecting portion 51, the base portion 52 and the tubular connecting portion 53 are integrally formed while being connected in the longitudinal direction.

The base portion 52 is, for example, formed into a tubular shape having a hollow structure inside. The base portion 52 is formed into a hollow cylindrical shape. The base portion 52 includes a slit 52X extending over the entire length in the axial direction in which a center axis of the base portion 52 extends. As shown in FIG. 3, the base portion 52 is, for example, accommodated in the terminal accommodating portion 34. An outer diameter of the base portion 52 is, for example, set slightly smaller than an inner diameter of the terminal accommodating portion 34. With the base portion 52 accommodated in the terminal accommodating portion 34, the outer peripheral surface of the base portion 52 is, for example, at least partially in contact with the inner peripheral surface of the terminal accommodating portion 34. The outer peripheral surface of the base portion 52 and the inner peripheral surface of the terminal accommodating portion 34 may be in surface contact, line contact or point contact with each other.

The tubular connecting portion 53 is formed into a tubular shape having a hollow structure inside. The tubular connecting portion 53 is formed into a hollow cylindrical shape. The charger-side terminal 82 of the charger-side connector 80 is inserted into the tubular connecting portion 53. The charger-side terminal 82 of this embodiment is a male terminal.

As shown in FIG. 6, the tubular connecting portion 53 includes, for example, a plurality of resilient pieces 53A provided at predetermined intervals along a circumferential direction of the tubular connecting portion 53. The tubular connecting portion 53 is, for example, formed such that the plurality of resilient pieces 54 form a hollow cylindrical shape as a whole. In an example shown in FIGS. 6 and 7, the inner peripheral surfaces or radially inward facing surfaces of the plurality of resilient pieces 54 correspond to the inner contour or inner surface of the tubular connecting portion 53, and the outer peripheral surfaces or radially outward facing surfaces of the plurality of resilient pieces 54 correspond to the outer contour or outer surface of the tubular connecting portion 53. In the tubular connecting portion 53 of this embodiment, eight resilient pieces 54 are provided at the predetermined intervals along the circumferential direction of the base portion 52. In the tubular connecting portion 53 of this embodiment, eight resilient pieces 54 are provided at equal intervals along the circumferential direction of the base portion 52. The tubular connecting portion 53 is provided with slits 53X extending over the entire length in an axial direction, in which a center axis of the tubular connecting portion 53 extends, and provided at predetermined intervals along the circumferential direction of the tubular connecting portion 53.

One of the plurality of slits 53 is, for example, formed to be continuous with the slit 52X of the base portion 52. That is, the one slit 53X is formed to communicate with the slit 52X of the base portion 52. The slit 52X is, for example, formed to be narrower than the slit 53X in a dimension along the circumferential direction of the base portion 52 (i.e. width). Each slit 53X is, for example, formed to have a constant width over the entire length in the longitudinal direction.

Figure 7:
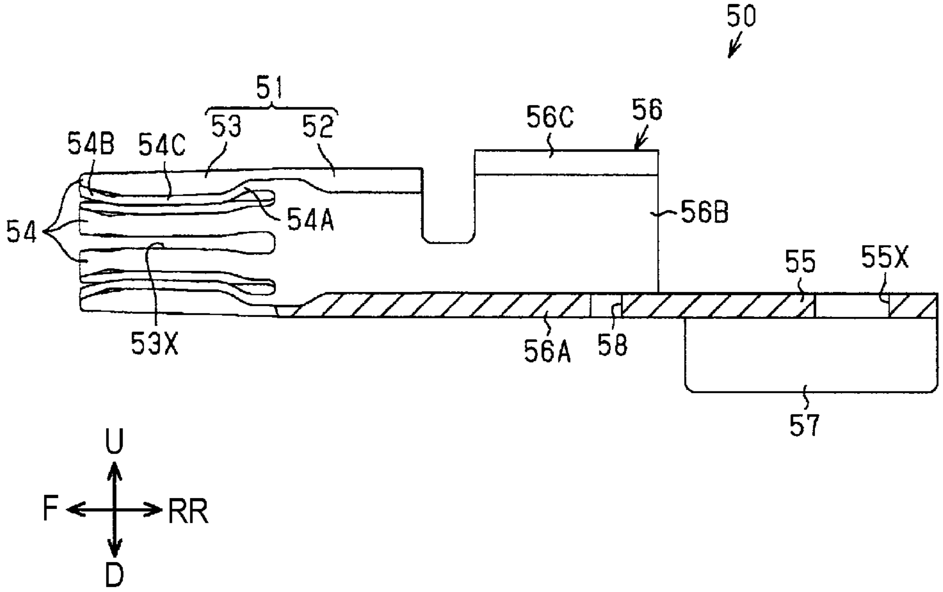
FIG. 7 is a schematic section showing the vehicle-side terminal of the one embodiment.

As shown in FIG. 7, each resilient piece 54 includes a base end part 54A (here, rear end part) connected to the base portion 52, a tip part 54B (here, front end part) located on a side opposite to the base end part 54A in the longitudinal direction and a contact portion 54C located between the base end part 54A and the tip part 54B. Each resilient piece 54 is cantilevered with the tip part 54B as a free end and the base end part 54A as a fixed end. Each resilient piece 54 is springy. Each resilient piece 54 is configured to be radially deflectable by being resiliently deformed.

The base end part 54A is, for example, formed to be smaller than the contact portion 54C in a diameter along a radial direction of the tubular connecting portion 53 (i.e. thickness). The base end part 54A is, for example, formed to have a smaller thickness than the base portion 52. A thickness of the contact portion 54C is, for example, the same as that of the base portion 52. The thickness of the contact portion 54C is, for example, constant over the entire length in the longitudinal direction of the contact portion 54C. The tip part 54B is, for example, formed to have a smaller thickness than the contact portion 54C. The thickness of the tip part 54B becomes smaller from the side of the contact portion 54C toward an opening end of the tubular connecting portion 53. The inner surface of the tip part 54B is formed into a slope.

As shown in FIG. 3, an outer diameter of the tubular connecting portion 53 is, for example, set smaller than the inner diameter of the terminal accommodating portion 34. An inner diameter of the tubular connecting portion 53 is set slightly smaller than an outer diameter of the charger-side terminal 82. The tubular connecting portion 53 is, for example, so formed that the inner diameter becomes smaller from the side of the base portion 52 toward the opening end of the tubular connecting portion 53. However, the tubular connecting portion 53 is so formed that the inner diameter increases from the side of the contact portions 54C toward the opening end of the tubular connecting portion 53 at the tip parts 54B. That is, a tip part of the tubular connecting portion 53 is formed to guide the charger-side terminal 82 to a back side of the tubular connecting portion 53 in an inserting direction. When the charger-side terminal 82 is inserted into the tubular connecting portion 53, the plurality of resilient pieces 54 (specifically, inner peripheral surfaces of the contact portions 54C of the resilient pieces 54) contact the outer peripheral surface of the charger-side terminal 82. In this way, the tubular connecting portion 53 (terminal connecting portion 51) and the charger-side terminal 82 are electrically connected. The base portion 52 and the tubular connecting portion 53 (i.e. terminal connecting portion 51) described above are accommodated in the terminal accommodating portion 34.

(Configuration of Wire Connecting Portion 55)

Figure 8:
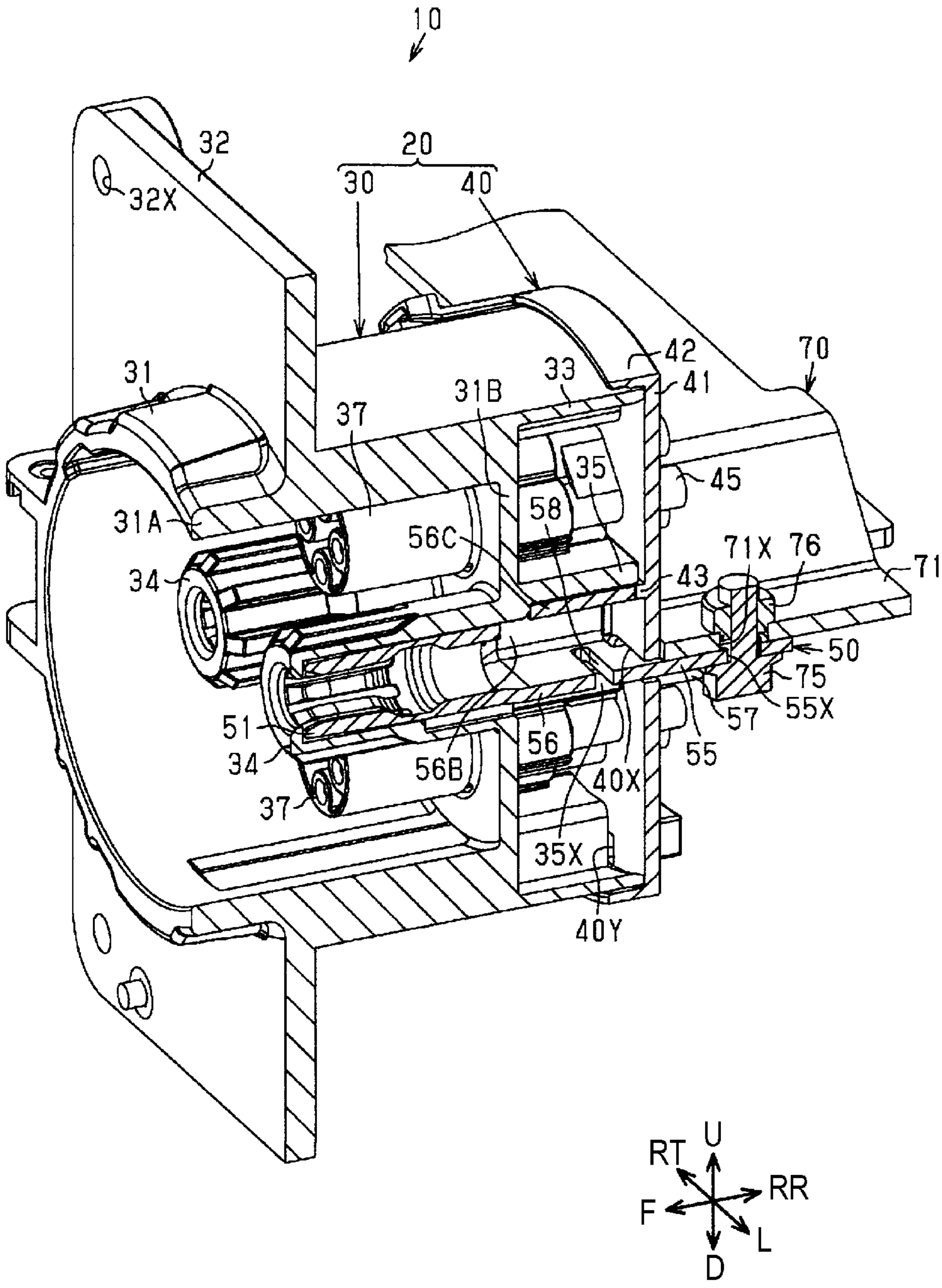
FIG. 8 is a perspective view in section showing the vehicle-side connector.

As shown in FIG. 8, the wire connecting portion 55 is, for example, provided in a rear end part of the vehicle-side terminal 50. The wire connecting portion 55 is electrically connected to an end part of the wire 70. The wire 70 of this embodiment includes a busbar 71 made of a metal material excellent in conductivity. The busbar 71 is, for example, in the form of a flat plate. The busbar 71 includes, for example, a through hole 71X penetrating in a plate thickness direction (here, vertical direction). A metal material such as a copper-based or aluminum-based metal material can be used as the material of the busbar 71.

The wire connecting portion 55 is in the form of a flat plate. The wire connecting portion 55 includes, for example, a through hole 55X penetrating in a plate thickness direction (here, vertical direction). The wire connecting portion 55 is connected to the busbar 71, such as by bolting, ultrasonic welding or crimping. In this embodiment, the busbar 71 is so provided on the upper surface of the wire connecting portion 55 that the through hole 55X of the wire connecting portion 55 and the through hole 71X of the busbar 71 overlap in the vertical direction. By fastening a nut 76 to a shaft part of a bolt 75 inserted through the through holes 55X and 71X, the wire connecting portion 55 and the busbar 71 are connected. In this way, the wire connecting portion 55 and the busbar 71 are electrically connected.

As shown in FIG. 5, reinforcing portions 57 projecting in a direction intersecting the longitudinal direction of the vehicle-side terminal 50 are, for example, formed on both lateral end parts of the wire connecting portion 55. The reinforcing portions 57 of this embodiment are formed to project downward from the both lateral end parts of the wire connecting portion 55. Each reinforcing portion 57 is, for example, formed to extend over the entire length in the longitudinal direction of the wire connecting portion 55.

(Configuration of Intermediate Portion 56)

The intermediate portion 56 is, for example, provided between the terminal connecting portion 51 and the wire connecting portion 55. The intermediate portion 56 is formed into a rectangular tube shape having a hollow structure inside. The intermediate portion 56 is formed to have a rectangular planar shape when viewed from an axial direction in which a center axis of the intermediate portion 56 extends. The intermediate portion 56 of this embodiment includes a bottom wall 56A continuously and integrally formed with the wire connecting portion 55, a pair of side walls 56B formed to project upward from both lateral end parts of the bottom wall 56A, and a facing wall 56C integrally formed to the side walls 56B to face the bottom wall 56A.

The intermediate portion 56 includes a slit 56X extending over the entire length in the axial direction of the intermediate portion 56. The slit 56X is, for example, formed in the facing wall 56C. The slit 56X of this embodiment is formed in a laterally central part of the facing wall 56C. As shown in FIG. 3, the intermediate portion 56 is, for example, held in the terminal holding portion 35. The intermediate portion 56 is, for example, so dimensioned as to be accommodated into the internal space of the terminal holding portion 35. The outer surface of the intermediate portion 56 is, for example, shaped to correspond to the inner surface of the terminal holding portion 35. The terminal holding portion 35 is formed to surround the outer periphery of the intermediate portion 56. Outside dimensions of the intermediate portion 56 are, for example, larger than the inner diameter of the terminal accommodating portion 34. The front surface of the intermediate portion 56 is, for example, locked to the rear surface of the back wall portion 31B exposed from the terminal holding portion 35. With the intermediate portion 56 accommodated in the terminal holding portion 35, the outer surface of the intermediate portion 56 is at least partially in contact with the inner surface of the terminal holding portion 35. The outer surface of the intermediate portion 56 and the inner surface of the terminal holding portion 35 may be in surface contact, line contact or point contact with each other.

(Configuration of Through Hole 58)

As shown in FIG. 5, the vehicle-side terminal 50 includes a through hole 58 formed between the terminal connecting portion 51 and the wire connecting portion 55. The through hole 58 is, for example, formed in the bottom wall 56A of the intermediate portion 56. The through hole 58 is formed to discharge a liquid such as water flowing from the side of the terminal connecting portion 51 in a direction different from a direction toward the wire connecting portion 55. The through hole 58 is, for example, formed to penetrate through the bottom wall 56A in a plate thickness direction (here, vertical direction). The through hole 58 is, for example, formed to extend in the lateral direction.

As shown in FIG. 8, the through hole 58 is formed at a position vertically overlapping the slit 35X of terminal holding portion 35 with the vehicle-side terminal 50 accommodated in the terminal accommodating portion 34 and the terminal holding portion 35. These through hole 58 and slit 35X function as a water drainage hole for letting a liquid such as water having intruded from the side of the terminal connecting portion 51 escape to a part other than the wire connecting portion 55 (here, downward).

As shown in FIG. 5, a coupling portion 59 having a smaller lateral dimension than the wire connecting portion 55 and the bottom wall 56A of the intermediate portion 56 is formed between the wire connecting portion 55 and the intermediate portion 56. In other words, groove portions 59A recessed toward a laterally central part are formed on both lateral end parts of the coupling portion 59.

Since the vehicle-side terminal 50 is formed by press-working a metal plate, a plate thickness (i.e. thickness) is constant as a whole and the thickness is partially reduced in parts of the base end part 54A and the tip part 54B. The plate thickness of a major part of the vehicle-side terminal 50, specifically, the plate thickness of the vehicle-side terminal 50 in a part where the thickness is not set small, can be, for example, about 2 to 3 mm (Configuration of Retainer 40)

As shown in FIG. 3, the retainer 40 is mounted on the rear end of the tube portion 33 of the housing body 30. The retainer 40 retains the vehicle-side terminals 50. The retainer 40 is, for example, made of synthetic resin. A synthetic resin such as polyolefin, polyamide, polyester or ABS resin can be, for example, as a material of the retainer 40.

The retainer 40 includes a base portion 41, a peripheral wall 42, and terminal pressing portions 43. The base portion 41 is, for example, in the form of a circular plate. The peripheral wall 42 is, for example, formed to project forward from a peripheral edge part of the base portion 41. The peripheral wall 42 is, for example, formed over the entire periphery in a circumferential direction of the peripheral edge part of the base portion 41. The peripheral wall 42 is, for example, disposed outside the tube portion 33 of the housing body 30. That is, the peripheral wall 42 is externally fit to the tube portion 33 of the housing body 30.

As shown in FIG. 4, a plurality of locking portions 38 are formed on the outer peripheral surface of the tube portion 33. The plurality of locking portions 38 are provided at predetermined intervals in a circumferential direction of the tube portion 33. Each locking portion 38 is formed with a locking claw 38A projecting radially outwardly of the tube portion 33. The peripheral wall 42 is formed with a plurality of locking frame portions 44, to which the locking claws 38A of the locking portions 38 are locked. The respective locking frame portions 44 are provided at positions corresponding to the locking portions 38. That is, the plurality of locking frame portions 44 are provided at predetermined intervals in a circumferential direction of the peripheral wall 42. Each locking frame portion 44 is, for example, in the form of a substantially U-shaped frame, and includes an engaging hole 44X engageable with the locking claw 38A in a center. Each locking frame portion 44 is cantilevered with a base end part (i.e. end part connected to the base portion 41) as a fixed end and a tip part on a side opposite to the base end part as a free end. Each locking frame portion 44 is, for example, configured to be radially deflectable by being resiliently deformed. The retainer 40 is, for example, mounted on the rear end of the tube portion 33 by engaging the locking claws 38A with the engaging holes 44X of the respective locking frame portions 44.

As shown in FIG. 3, the terminal pressing portion 43 is, for example, formed to project forward from the base portion 41. The terminal pressing portion 43 is provided at a position corresponding to the terminal holding portion 35 of the housing body 30.

Figure 9:
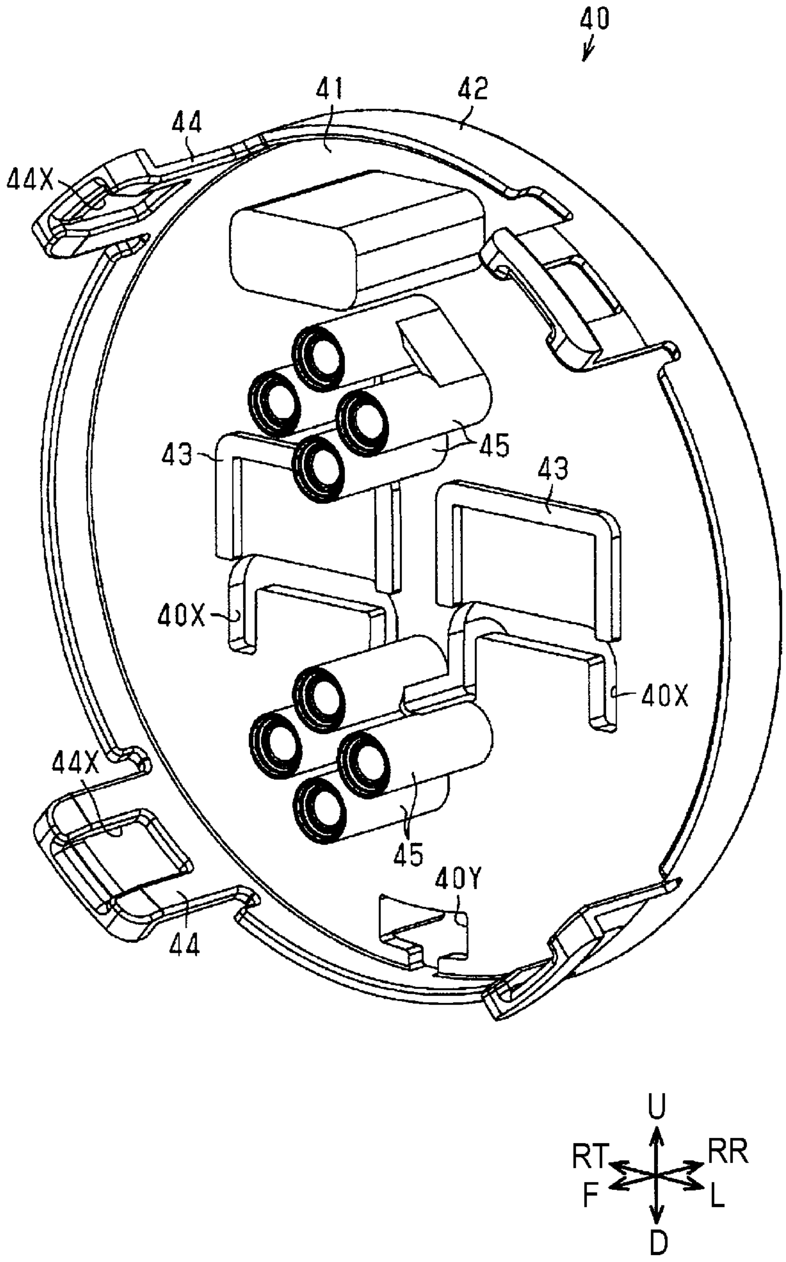
FIG. 9 is a schematic perspective view showing a retainer of the one embodiment.

As shown in FIG. 9, the terminal pressing portion 43 of this embodiment is formed to have a U-shaped planar shape when viewed from the front-rear direction. The terminal pressing portion 43 is, for example, formed into a U shape open downward.

As shown in FIG. 8, the terminal pressing portion 43 is formed at a position corresponding to the side walls 56B and the facing wall 56C of the intermediate portion 56 of the vehicle-side terminal 50. A tip part of the terminal pressing portion 43 is in contact with the rear surfaces of the side walls 56B and the rear surface of the facing wall 56C. The vehicle-side terminal 50 can be retained from behind by this retainer 40.

The retainer 40 includes, for example, through holes 40X into which the wire connecting portions 55 and the reinforcing portions 57 of the vehicle-side terminals 50 are inserted. The through hole 40X is formed to penetrate through the base portion 41 in the front-rear direction. The through hole 40X is formed into a shape corresponding to the wire connecting portion 55 and the reinforcing portions 57. As shown in FIG. 9, the through hole 40X of this embodiment is formed to have a U-shaped planar shape when viewed from the front-rear direction. The through hole 40X is formed below the terminal pressing portion 43.

The retainer 40 includes, for example, a water drainage hole 40Y provided in the lower end of the base portion 41. The water drainage hole 40Y is formed to penetrate through the base portion 41 in the front-rear direction. As shown in FIG. 8, the water drainage hole 40Y is a hole for discharging a liquid such as water flowing through the through holes 58 of the vehicle-side terminals 50, the slits 35X of the terminal holding portions 35 and the like to the outside of the vehicle-side connector 10.

The retainer 40 includes, for example, a plurality of signal line holding portions 45. Signal lines connected to the signal terminals held in the signal terminal holding portions 37 of the housing body 30 are inserted into the signal line holding portions 56. The signal terminals are retained from behind by the signal line holding portions 45.

Next, functions of this embodiment are described.

(1) The vehicle-side terminal 50 includes the terminal connecting portion 51 to be electrically connected to the charger-side terminal 82 as a mating terminal, the wire connecting portion 55 to be electrically connected to the wire 70 and the intermediate portion 56 provided between the terminal connecting portion 51 and the wire connecting portion 55. The terminal connecting portion 51 is formed into a hollow cylindrical shape. The terminal connecting portion 51 includes the slits 52X, 53X extending over the entire length in the axial direction of the terminal connecting portion 51. The intermediate portion 56 is formed into a rectangular tube shape. The intermediate portion 56 includes the slit 56X extending over the entire length in the axial direction of the intermediate portion 56.

According to this configuration, the terminal connecting portion 51 and the intermediate portion 56 are formed into a tubular shape having a hollow structure inside. Further, the terminal connecting portion 51 and the intermediate portion 56 are formed with the slits 52X, 53X and 56X extending over the entire lengths in the axial directions of these terminal connecting portion 51 and intermediate portion 56. Thus, the vehicle-side terminal 50 including the terminal connecting portion 51 and the intermediate portion 56 can be formed by press-working. In this way, the vehicle-side terminal 50 can be more inexpensively manufactured than conventional connection terminals manufactured by cutting. As a result, increases in the manufacturing costs of the vehicle-side terminal 50 and the vehicle-side connector 10 can be suitably suppressed.

(2) The terminal connecting portion 51 includes the hollow cylindrical base portion 52 connected to the intermediate portion 56 and the hollow cylindrical tubular connecting portion 53 connected to the base portion 52. The tubular connecting portion 53 includes the plurality of resilient pieces 54 provided at the predetermined intervals along the circumferential direction of the tubular connecting portion 53, and the plurality of resilient pieces 54 are formed to form a hollow cylindrical contour of the tubular connecting portion 53.

According to this configuration, the terminal connecting portion 51 can be in contact with the charger-side terminal 82 as a mating terminal at many points by the plurality of resilient pieces 54. Thus, many contact points with the charger-side terminal 82 can be ensured and contact resistance between the charger-side terminal 82 and the terminal connecting portion 51 can be reduced. Further, since the vehicle-side terminal 50 can be formed by press-working, an increase in processing cost caused by an increase in the number of the resilient pieces 54 can be suppressed as compared to the case where a connection terminal is formed by cutting. Thus, the number of the resilient pieces 54 can be increased while an increase in manufacturing cost is suppressed. As a result, the number of the contact points with the charger-side terminal 82 can be increased, wherefore the contact resistance between the charger-side terminal 82 and the terminal connecting portion 51 can be suitably reduced. Since heat generation during the energization of the vehicle-side terminal 50 can be suitably suppressed in this way, a large current can be caused to flow in the vehicle-side terminal 50. Thus, even if a large current is used to increase the capacity of the power storage device installed in the vehicle or shorten a charging time, such a large current can be easily dealt with. For example, even if a large current of about 200 to 400 A flows in the vehicle-side terminal 50, such a large current can be easily dealt with.

(3) Each resilient piece 54 includes the base end part 54A connected to the base portion 52, the tip part 54B, which is an end part on the side opposite to the base end part 54A in the axial direction of the tubular connecting portion 53, and the contact portion 54C provided between the base end part 54A and the tip part 54B. The thickness of the base end part 54A is smaller than that of the contact portion 54C.

According to this configuration, since the base end part 54A serving as the fixed end of each resilient piece 54 is formed to be thinner than the contact portion 54C, each resilient piece 54 is easily resiliently deformed. Since each resilient piece 54 is easily deflected in the radial direction of the tubular connecting portion 53 in this way, each resilient piece 54 can be suitably brought into contact with the outer surface of the charger-side terminal 82.

(4) The thickness of the contact portion 54C is constant over the entire length in the longitudinal direction of the contact portion 54C along the axial direction of the tubular connecting portion 53. According to this configuration, the contact portion 54C can be formed to be thicker than the base end part 54A over the entire length in the longitudinal direction of the contact portion 54C. Since conductor cross-sectional areas of the contact portion 54C and the tubular connecting portion 53 can be increased in this way, heat generation during the energization of the vehicle-side terminal 50 can be suitably suppressed.

(5) The thickness of the tip part 54B becomes smaller from the side of the contact portion 54C toward the opening end of the tubular connecting portion 53. The tubular connecting portion 53 is so formed that the inner diameter becomes larger from the side of the contact portions 54C toward the opening end of the tubular connecting portion 53 at the tip parts 54B. According to this configuration, an opening diameter of the tubular connecting portion 53 becomes wider from the side of the contact portions 54C toward the opening end of the tubular connecting portion 53 at an opening end part of the tubular connecting portion 53. In this way, the charger-side terminal 82 is guided to the back side of the tubular connecting portion 53 along the slopes of the tip parts 54B in inserting the charger-side terminal 82 into the tubular connecting portion 53. In this way, the charger-side terminal 82 can be easily inserted into the tubular connecting portion 53.

(6) The tubular connecting portion 53 includes the plurality of slits 53X extending over the entire length in the axial direction of the tubular connecting portion 53 from the opening end of the tubular connecting portion 53. The plurality of slits 53X are provided at the predetermined intervals along the circumferential direction of the tubular connecting portion 53. One of the plurality of slits 53X communicates with the slit 52X of the base portion 52.

According to this configuration, the plurality of slits 53X are formed to extend over the entire length in the axial direction of the tubular connecting portion 53. Thus, water and mud having intruded into the tubular connecting portion 53 can be suitably discharged to the outside of the tubular connecting portion 53 through the slits 53X.

(7) The planar shape of the intermediate portion 56 when viewed from the axial direction of the intermediate portion 56 is larger in size than that of the terminal connecting portion 51 when viewed from the axial direction of the terminal connecting portion 51. According to this configuration, a conductor cross-sectional area of the intermediate portion 56 can be increased. Thus, heat generation during the energization of the vehicle-side terminal 50 can be suitably suppressed.

(8) The vehicle-side terminal 50 includes the through hole 58 formed between the wire connecting portion 55 and the terminal connecting portion 51. The through hole 58 is formed to discharge a liquid in the direction (downward in this embodiment) different from the direction toward the wire connecting portion 55.

According to this configuration, even if a liquid such as water flows from the side of the terminal connecting portion 51 toward the side of the wire connecting portion 55, the flow of that liquid to the wire connecting portion 55 can be suppressed by the through hole 58 formed between the wire connecting portion 55 and the terminal connecting portion 51. In this way, the flow of the liquid such as water to a connected part of the wire connecting portion 55 and the wire 70 can be suppressed. Thus, the occurrence of corrosion, for example, in the connected part of the wire connecting portion 55 and the wire 70 can be suitably suppressed.

(9) The wire connecting portion 55 is formed with the reinforcing portions 57 projecting in the direction intersecting the longitudinal direction in which the terminal connecting portion 51, the intermediate portion 56 and the wire connecting portion 55 are arranged. According to the configuration, the strength of the wire connecting portion 55 to be connected to the wire 70 can be enhanced by providing the reinforcing portions 57. Further, since a conductor cross-sectional area of the wire connecting portion 55 can be increased, heat generation during the energization of the vehicle-side terminal 50 can be suitably suppressed.

Other Embodiments

The above embodiment can be modified and carried out as follows. The above embodiment and the following modifications can be carried out in combination without technically contradicting each other.

- The structure of the connector housing 20 in the above embodiment is not particularly limited. That is, if the connector housing 20 has a structure capable of holding the vehicle-side terminals 50, other structures are not particularly limited.

Figure 10:
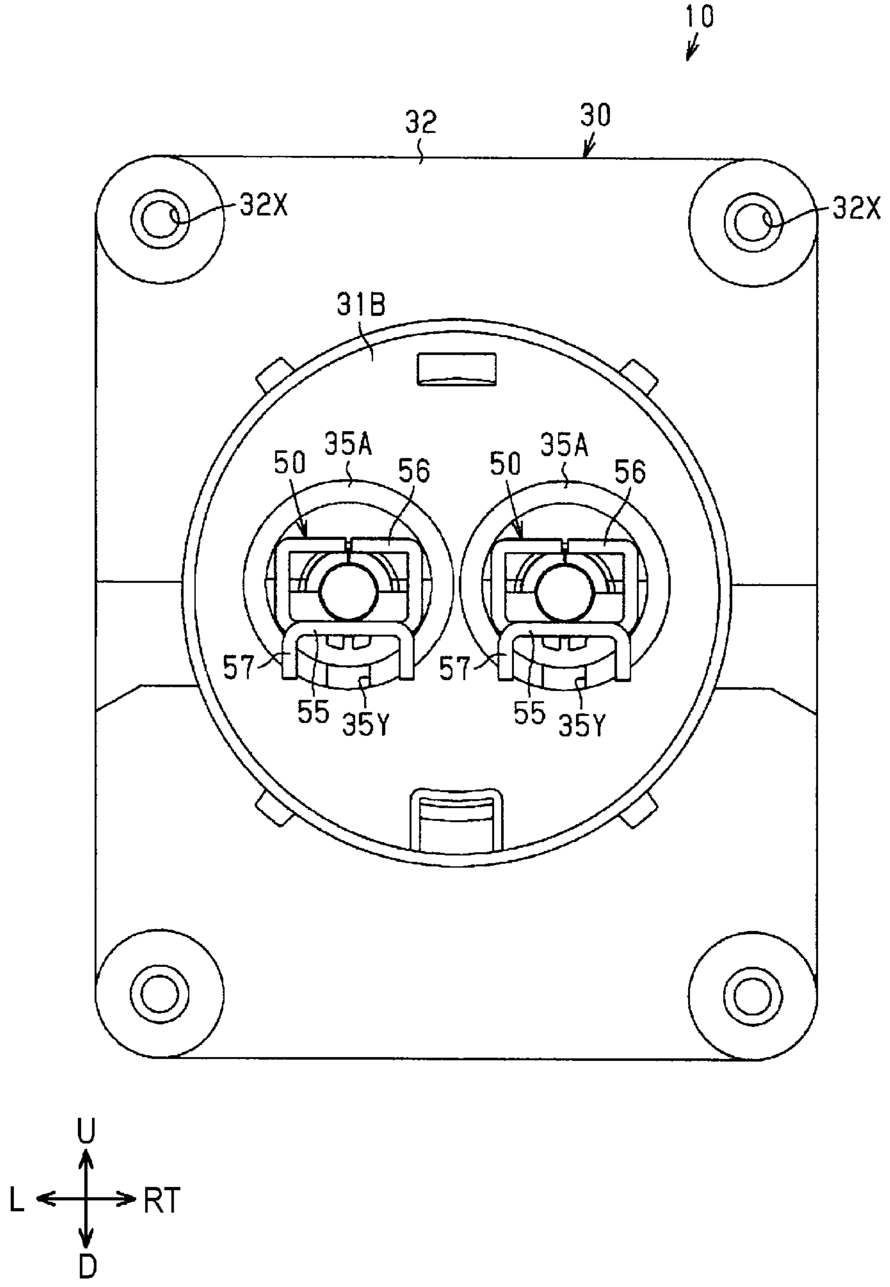
FIG. 10 is a schematic back view showing a vehicle-side connector of a modification.

For example, as shown in FIG. 10, the terminal holding portions 35 may be changed to hollow cylindrical terminal holding portions 35A. The terminal holding portion 35A is formed to surround the intermediate portion 56 having a rectangular tube shape. The terminal holding portion 35A includes a slit 35Y extending over the entire length in an axial direction of the terminal holding portion 35A. The slit 35Y is, for example, provided in a circumferentially lower end of the terminal holding portion 35A.

An inner diameter of the terminal holding portion 35A is, for example, set to allow the rotation of the intermediate portion 56 about the center axis of the intermediate portion 56 inside the terminal holding portion 35A. The inner diameter of the terminal holding portion 35A is, for example, set to be able to restrict the rotation of the intermediate portion 56 about the center axis of the intermediate portion 56 within a predetermined range. For example, the rotation of the intermediate portion 56 about the center axis of the intermediate portion 56 is restricted by the outer surface of the intermediate portion 56 partially contacting the inner surface of the terminal holding portion 35A.

Although the slit 35X is formed to extend over the entire length in the axial direction of the terminal holding portion 35 in the above embodiment, there is no limitation to this. For example, the slit 35X may be formed only partially in the axial direction of the terminal holding portion 35. For example, the slit 35X may be formed only at a position vertically overlapping the through hole 58 of the vehicle-side terminal 50 in the axial direction of the terminal holding portion 35.

Figure 11:
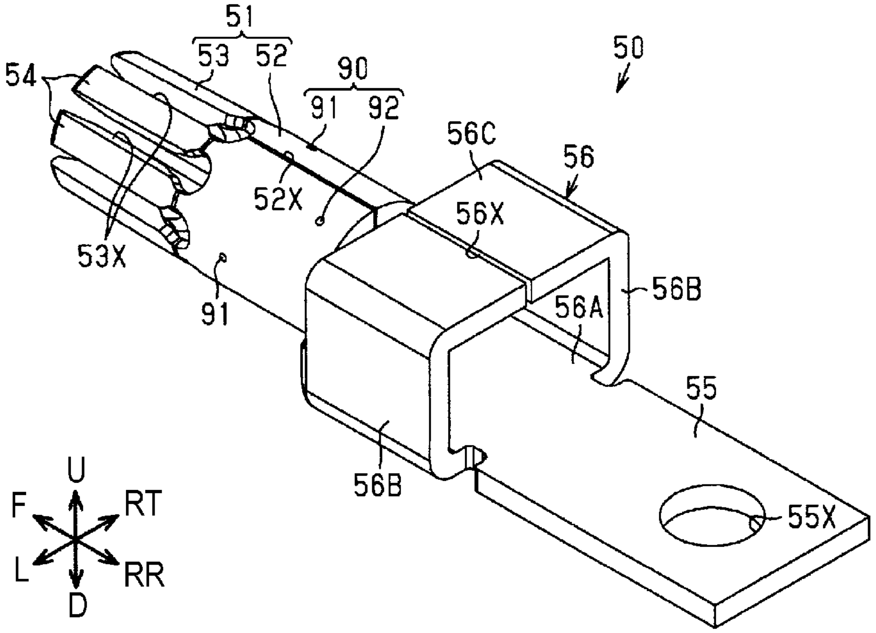
FIG. 11 is a schematic perspective view showing a vehicle-side terminal of a modification.
Figure 12:
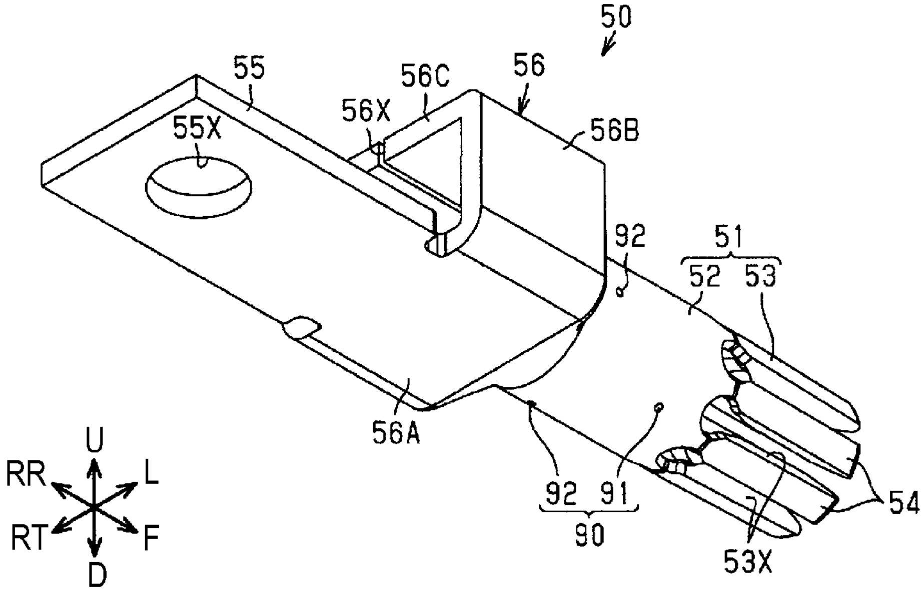
FIG. 12 is a schematic perspective view showing the vehicle-side terminal of the modification.

- The slit 35X in the above embodiment may not be formed.
- The retainer 40 in the above embodiment may be omitted.
- As shown in FIGS. 11 and 12, a plurality of projections 90 projecting radially outwardly of the base portion 52 may be formed on the outer surface of the base portion 52 of the vehicle-side terminal 50. Each projection 90 is formed to project further radially outward than the outer surface of each resilient piece 54. The plurality of projections 90 are provided at positions different in the axial direction of the base portion 52. For example, the plurality of projections 90 include a plurality of (here, three) projections 91 provided on a side near the tubular connecting portion 53 and a plurality of (here, three) projections 92 provided on a side near the intermediate portion 56. The projections 91, 92 are, for example, provided at positions different from each other in the circumferential direction of the base portion 52. The plurality of projections 91 are, for example, provided at predetermined intervals along the circumferential direction on the same circumference of the base portion 52. The plurality of projections 91 are, for example, provided at positions separated by $2\pi/3$ [rad] along the circumferential direction of the base portion 52. The plurality of projections 92 are, for example, provided at predetermined intervals along the circumferential direction on the same circumference of the base portion 52. The plurality of projections 92 are, for example, provided at positions separated by $2\pi/3$ [rad] along the circumferential direction of the base portion 52.

Figure 13:
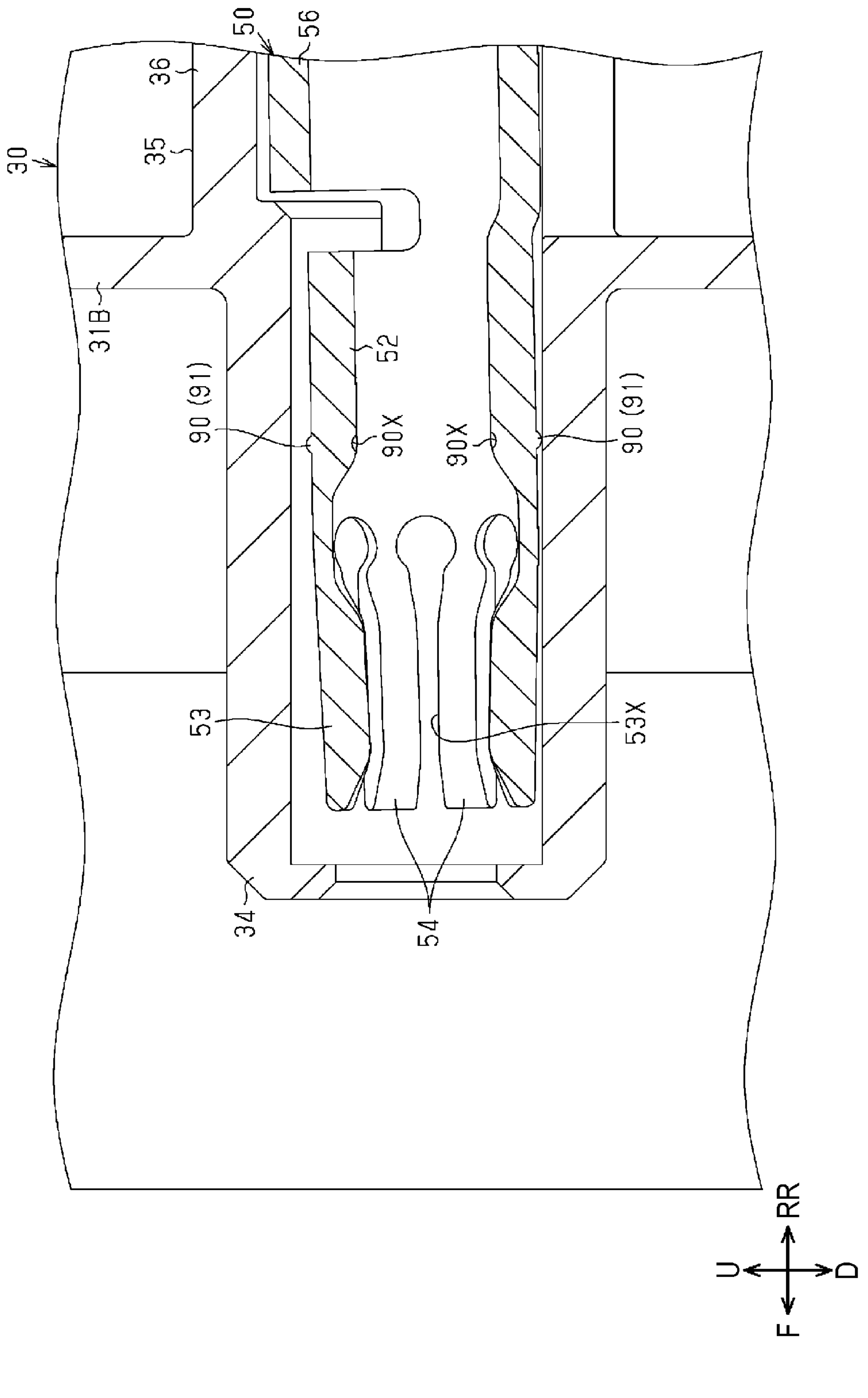
FIG. 13 is a schematic section showing a part of the vehicle-side connector of the modification.

As shown in FIG. 13, each projection 90 is, for example, formed to be raised radially outwardly of the base portion 52 from the outer surface of the base portion 52. Each projection 90 is, for example, formed continuously and integrally with the base portion 52. Recesses 90X recessed toward the projections 90 are formed at positions corresponding to the respective projections 90 in the inner surface of the base portion 52. For example, the projections 90 and the recesses 90X are formed to overlap in radial directions of the base portion 52.

If the tubular connecting portion 53 of the vehicle-side terminal 50 contacts the inner surface of the terminal accommodating portion 34, there is a problem of increasing an insertion force in inserting the charger-side terminal 82 into the tubular connecting portion 53. Further, if the insertion force in inserting the charger-side terminal 82 into the tubular connecting portion 53 is increased, there is a problem that a load applied to the tubular connecting portion 53 increases and the tubular connecting portion 53 is easily damaged.

In contrast, in this modification, the projections 90 projecting further radially outward than the outer surface of the tubular connecting portion 53 are provided on the outer surface of the base portion 52. Thus, if the vehicle-side terminal 50 is, for example, inclined in the terminal accommodating portion 34, the projection 90 can be brought into contact with the inner surface of the terminal accommodating portion 34 before the outer surface of the tubular connecting portion 53 contacts the inner surface of the terminal accommodating portion 34. In this way, even if the vehicle-side terminal 50 is inclined in the terminal accommodating portion 34, the contact of the vehicle-side terminal 50 with the inner surface of the terminal accommodating portion 34 can be suitably suppressed. Therefore, an increase in the insertion force in inserting the charger-side terminal 82 into the tubular connecting portion 53 can be suitably suppressed.

In the modification shown in FIGS. 11 to 13, the number and formation positions of the projections 90 are not particularly limited.

The structure of the vehicle-side terminal 50 in the above embodiment is not particularly limited. That is, if the vehicle-side terminal 50 includes the terminal connecting portion 51 having a hollow cylindrical shape, the wire connecting portion 55 and the intermediate portion 56 having a rectangular tube shape, other structures are not particularly limited.

For example, the number of the resilient pieces 54 in the tubular connecting portion 53 is not particularly limited. The number of the resilient pieces 54 in the tubular connecting portion 53 may be seven or less or nine or more.

Although the base end part 54A of each resilient piece 54 is formed to be thinner than the contact portion 54C in the above embodiment, there is no limitation to this. For example, the base end part 54A may be formed to have the same thickness as the contact portion 54C.

Although the tip part 54B of each resilient piece 54 is formed to be thinner than the contact portion 54C in the above embodiment, there is no limitation to this. For example, the tip part 54B may be formed to have the same thickness as the contact portion 54C.

The base portion 52 of the terminal connecting portion 51 in the above embodiment may be omitted. In this case, the terminal connecting portion 51 is, for example, composed only of the tubular connecting portion 53.

The intermediate portion 56 is formed to have a rectangular planar shape when viewed from the axial direction of the intermediate portion 56 in the above embodiment, there is no limitation to this. For example, the intermediate portion 56 may be formed to have a polygonal planar shape with five or more sides when viewed from the axial direction of the intermediate portion 56.

The reinforcing portions 57 of the vehicle-side terminal 50 in the above embodiment may be omitted.

The through hole 58 of the vehicle-side terminal 50 in the above embodiment may be omitted.

Projections similar to the projections 90 shown in FIG. 11 may be provided on the outer surface of the intermediate portion 56 of the above embodiment.

A connection method of the wire connecting portion 55 and the wire 70 in the above embodiment is not limited to bolting. For example, the wire connecting portion 55 and the wire 70 may be connected by crimping, laser welding or ultrasonic welding.

The structure of the wire 70 in the above embodiment is not particularly limited. For example, the wire 70 may be embodied by a structure including the busbar 71 and an insulation coating for covering the outer periphery of the busbar 71. A stranded wire formed by twisting a plurality of metal strands or a tubular conductor having a hollow structure inside can be used as a core of the wire 70 without limitation to the busbar 71. Further, a combination of a stranded wire and a column-like or tubular conductor such as the busbar 71 may be used as the core of the wire 70.

The vehicle-side connector 10 is embodied by a connector for quick charging provided in the vehicle V such as an electric vehicle or plug-in hybrid vehicle in the above embodiment, there is no limitation to this. The type of the vehicle-side connector 10 is not particularly limited, for example, if the vehicle-side connector 10 includes the vehicle-side terminal(s) 50 and the connector housing 20 for holding the vehicle-side terminal(s) 50.

In the above embodiment and modifications, the slit 52X and/or the slit 56X may be clearance(s) formed between two end surfaces of a metal plate constituting the vehicle-side terminal 50. The two end surfaces of the metal plate may be openable and closable, i.e. contactable and separable. A width of the slit 52X and/or 56X, which is a distance between the two end surfaces of the metal plate, may be temporarily or constantly zero.

Figure 14:
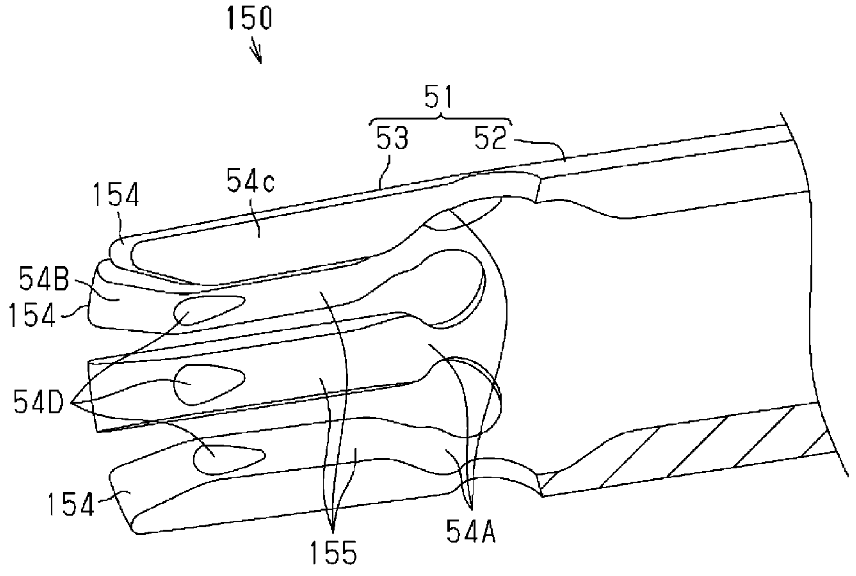
FIG. 14 is a perspective view partly in section showing a part of a vehicle-side connector of a modification.

The shape of the resilient pieces 54 in the above embodiment and modifications may be changed. FIG. 14 is a schematic diagram showing a vehicle-side terminal 150 as another modification. This vehicle-side terminal 150 is different from the vehicle-side terminals 50 according to the embodiment and modifications in the shape of each resilient piece 154 of a tubular connecting portion 53, more specifically in the shape of an inner peripheral surface 155 of each resilient piece 154. The vehicle-side terminal 150 of the modification is described below, centering on points of difference from the vehicle-side terminal 50 according to the embodiment and components similar to those of the embodiment are denoted by the same reference signs and not described in detail.

(Configuration of Inner Peripheral Surface 155)

A plurality of the resilient pieces 154 of the vehicle-side terminal 150 have the inner peripheral surfaces 155 surrounding a center axis of the tubular connecting portion 53. The inner peripheral surface 155 of each resilient piece 154 includes a dent 54D. The dent 54D is, for example, formed in the inner peripheral surface 155 of a contact portion 54C of the resilient piece 154.

The dents 54D of the plurality of resilient pieces 154 are provided at the same position in an axial direction of the tubular connecting portion 53. The same position in the axial direction of the tubular connecting portion 53 means that all the dents 54D have parts overlapping the same plane which is a cross-section passing through a predetermined position in the axial direction of the tubular connecting portion 53 and perpendicular to the axial direction of the tubular connecting portion 53. That is, if the dents 54D are provided at the same position in the axial direction of the tubular connecting portion 53, a virtual plane (cross-section) perpendicular to the axial direction of the tubular connecting portion 53 and passing through all the dents 54D is present. In a side view of the tubular connecting portion 53, all the dents 54D may be entirely aligned at the same position in the axial direction of the tubular connecting portion 53.

The dent 54D extends from the side of a tip part 54B toward the side of the contact portion 54C in each resilient piece 154. In an example of FIG. 14, the dent 54D is provided at a position closer to the tip part 54B than a base portion 52 in the inner peripheral surface 155 of each resilient piece 154. For example, the inner peripheral surface 155 of each resilient piece 154 may have a tip part inner peripheral surface, which is a slope corresponding to the tip part 54B, and a contact portion inner peripheral surface, which corresponds to the contact portion 54C, and the dent 54D may be adjacent to a boundary between the tip part inner peripheral surface and the contact portion inner peripheral surface on the contact portion inner peripheral surface of each resilient piece 154 or may extend across the boundary between the tip part inner peripheral surface and the contact portion inner peripheral surface.

The bottom surface of the dent 54D has a curved contour in the cross-section perpendicular to the axial direction of the tubular connecting portion 53, e.g. an arcuate contour. In the example of FIG. 14, the dent 54D is formed as a concave surface having a teardrop-shaped contour in a plan view of the inner peripheral surface 155.

The inner peripheral surface 155 in the contact portion 54C of each resilient piece 154 may have a region except the dent 54D (non-dent region). A curvature of the dent 54D is larger than that of the non-dent region of the inner peripheral surface 155 in the cross-section perpendicular to the axial direction of the tubular connecting portion 53. The curvature of the dent 54D is preferably closer to that of the outer peripheral surface of the charger-side terminal 82 than that of the non-dent region of the inner peripheral surface 155. The curvature of the dent 54D more preferably matches that of the outer peripheral surface of the charger-side terminal 82. The non-dent region of the inner peripheral surface 155 may have a curvature of 0, i.e. may be a flat surface.

Next, functions of the other modification are described.

The vehicle-side terminal 150 of the other modification exhibits effects similar to those of the vehicle-side terminal 50 of the above embodiment by having a configuration similar to that of the above embodiment. Further, in the vehicle-side terminal 150, the dents 54D are provided at the same position in the axial direction of the tubular connecting portion 53 in the inner peripheral surfaces 155 of the plurality of resilient pieces 154. According to this configuration, the vehicle-side terminal 150 is electrically connected to the charger-side terminal 82 using the dents 54D as contact points. Thus, even if the entire inner peripheral surfaces 155 are not formed into an arcuate shape matching the curvature of the outer peripheral surface of the charger-side terminal 82, the electrical connectivity of the vehicle-side terminal 150 and the charger-side terminal 82 can be improved. Therefore, the vehicle-side terminal 150 is easily processed as compared to the case where the entire inner peripheral surfaces 155 are processed according to the curvature of the outer peripheral surface of the charger-side terminal 82.

Since the base end part 54A serving as the fixed end of each resilient piece 154 is thinner than the contact portion 54C as in the above embodiment in the vehicle-side terminal 150 of the modification, each resilient piece 154 is easily resiliently deformed. In this way, each resilient piece 154 can be suitably brought into contact with the outer surface of the charger-side terminal 82. Further, a length of each resilient piece 154 necessary to provide predetermined deflection can be shortened. The predetermined deflection of each resilient piece 154 is radial deflection of the tubular connecting portion 53 having a magnitude necessary to insert the charger-side terminal 82 into the tubular connecting portion 53. Since the resilient pieces 154 can be shortened, the vehicle-side terminal 150 is easily miniaturized.

The thickness of the tip part 54B becomes smaller from the side of the contact portion 54C toward an opening end of the tubular connecting portion 53 as in the above embodiment in the vehicle-side terminal 150 of the modification. The tubular connecting portion 53 is so formed that the inner diameter becomes larger from the side of the contact portion 54C toward the opening end of the tubular connecting portion 53 in the tip part 54B. According to this configuration, the charger-side terminal 82 can be easily inserted into the tubular connecting portion 53. Further, the inner diameter can become larger from the side of the contact portion 54C toward the opening end of the tubular connecting portion 53 without making the outside dimensions of the tubular connecting portion 53 larger. In this way, the vehicle-side terminal 150 is easily miniaturized.

The embodiment disclosed this time should be considered illustrative in all aspects, rather than restrictive. The scope of the present invention is represented not by the meaning described above, but by claims and is intended to include all changes in the scope of claims and in the meaning and scope of equivalents.

LIST OF REFERENCE NUMERALS

V vehicle
10 vehicle-side connector
20 connector housing
30 housing body
31 fitting portion
31A receptacle
31B back wall portion
32 flange portion
32X mounting hole
33 tube portion
34 terminal accommodating portion
35, 35A terminal holding portion
35X, 35Y slit
36 peripheral wall
37 signal terminal holding portion
38 locking portion
38A locking claw
40 retainer
40X through hole
40Y water drainage hole
41 base portion
42 peripheral wall
43 terminal pressing portion
44 locking frame portion
44X engaging hole
45 signal line holding portion

50, 150 vehicle-side terminal (connection terminal)
51 terminal connecting portion
52 base portion
52X slit (first slit)
53 tubular connecting portion
53X slit (third slit)
54, 154 resilient piece
54A base end part
54B tip part
54C contact portion
54D dent of resilient piece
55 wire connecting portion
55X through hole
56 intermediate portion
56A bottom wall
56B side wall
56C facing wall
56X slit (second slit)
57 reinforcing portion
58 through hole
59 coupling portion
59X groove portion
70 wire
71 busbar
71X through hole
75 bolt
76 nut
80 charger-side connector
81 connector housing
82 charger-side terminal
90 projection
90X recess
91 projection
92 projection
155 inner peripheral surface of resilient piece

What is claimed is:

1. A connection terminal, comprising:
a terminal connecting portion to be electrically connected to a mating terminal;
a wire connecting portion to be electrically connected to a wire; and
an intermediate portion provided between the terminal connecting portion and the wire connecting portion,
wherein:
the terminal connecting portion has a hollow cylindrical shape,
the terminal connecting portion includes a hollow cylindrical base portion connected to the intermediate portion and a first slit extending over an entire length of the terminal connecting portion in an axial direction of the terminal connecting portion,
the intermediate portion has a rectangular tube shape, and
the intermediate portion includes a second slit extending over an entire length in an axial direction of the intermediate portion.

2. The connection terminal of claim 1, wherein:
the terminal connecting portion includes a hollow cylindrical tubular connecting portion connected to the base portion, and
the tubular connecting portion includes a plurality of resilient pieces provided at predetermined intervals along a circumferential direction of the tubular connecting portion and the plurality of resilient pieces form a hollow cylindrical contour of the tubular connecting portion.

3. The connection terminal of claim 2, wherein:
each resilient piece includes a base end part connected to the base portion, a tip part serving as an end part on a side opposite to the base end part in the axial direction of the tubular connecting portion and a contact portion provided between the base portion and the tip part, and
a thickness of the base end part is smaller than that of the contact portion.

4. The connection terminal of claim 3, wherein the thickness of the contact portion is constant over an entire length in a longitudinal direction of the contact portion along the axial direction of the tubular connecting portion.

5. The connection terminal of claim 3, wherein:
a thickness of the tip part becomes smaller from the side of the contact portion toward an opening end of the tubular connecting portion, and
an inner diameter of the tip part of the tubular connecting portion becomes larger from the side of the contact portion toward the opening end of the tubular connecting portion.

6. The connection terminal of claim 2, wherein:
the tubular connecting portion includes a plurality of third slits extending over an entire length in the axial direction of the tubular connecting portion from an opening end of the tubular connecting portion,
the plurality of third slits are provided at predetermined intervals along the circumferential direction of the tubular connecting portion,
some of the plurality of third slits constitute the first slit.

7. The connection terminal of claim 2, wherein:
the base portion includes a plurality of projections formed on an outer surface of the base portion,
the plurality of projections include two projections provided at positions different from each other in an axial direction of the base portion, and
each projection projects further radially outward than an outer surface of the tubular connecting portion.

8. The connection terminal of claim 2, wherein:
the plurality of resilient pieces respectively have a plurality of inner peripheral surfaces surrounding a center axis of the tubular connecting portion,
each of the plurality of inner peripheral surfaces includes a dent, and
the dents of the plurality of inner peripheral surfaces are provided at the same position in the axial direction of the tubular connecting portion.

9. The connection terminal of claim 8, wherein:
each resilient piece includes a tip part, and
the dent is provided at a position closer to the tip part of each resilient piece than the base portion in the inner peripheral surface of each resilient piece.

10. The connection terminal of claim 9, wherein:
each resilient piece includes a contact portion between the base portion and the tip part,
the inner peripheral surface of each resilient piece includes:
a tip part inner peripheral surface serving as a slope included in the tip part of each resilient piece; and
a contact portion inner peripheral surface included in the contact portion, and
the dent is adjacent to a boundary between the tip part inner peripheral surface and the contact portion inner peripheral surface in the contact portion inner peripheral surface of each resilient piece or extends across the boundary.

11. The connection terminal of claim 2, wherein the first slit includes a base portion slit and a tubular connecting portion slit, the base portion slit being narrower than the tubular connecting portion slit.

12. The connection terminal of claim 2, wherein:

each resilient piece includes a base end part connected to the base portion, a tip part serving as an end part on a side opposite to the base end part in the axial direction of the tubular connecting portion and a contact portion provided between the base portion and the tip part, and an inner diameter of the base end part is larger than an inner diameter of the contact portion.

13. The connection terminal of claim 2, wherein:

each resilient piece includes a base end part connected to the base portion, a tip part serving as an end part on a side opposite to the base end part in the axial direction of the tubular connecting portion and a contact portion provided between the base portion and the tip part, and outer surfaces of the base portion, the base end part, the contact portion, and the tip part form a continuous line along an entire length of the terminal connecting portion in an axial direction.

14. The connection terminal of claim 1, wherein a planar shape of the intermediate portion when viewed from the axial direction of the intermediate portion is larger in size than that of the terminal connecting portion when viewed from the axial direction of the terminal connecting portion.

15. The connection terminal of claim 1, further comprising a through hole between the wire connecting portion and the terminal connecting portion, the through hole penetrating through a conductive material of the connection terminal to discharge a liquid in a direction different from a direction toward the wire connecting portion.

16. The connection terminal of claim 1, wherein the wire connecting portion includes a reinforcing portion projecting in a direction intersecting a longitudinal direction along which the terminal connecting portion, the intermediate portion and the wire connecting portion are arranged.

17. A connector, comprising:

the connection terminal of claim 1; and a connector housing for holding the connection terminal.

18. The connector of claim 17, wherein:

the connector housing is mounted in a vehicle, and a charging connector is connected to the connector housing.

* * * * *